US011038904B2

(12) United States Patent
Kemp et al.

(10) Patent No.: US 11,038,904 B2
(45) Date of Patent: *Jun. 15, 2021

(54) ELECTRONIC MAIL SECURITY SYSTEM

(71) Applicant: Chicago Mercantile Exchange Inc., Chicago, IL (US)

(72) Inventors: Thomas Anthony Kemp, Aurora, IL (US); Metin Carlo DePaolis, Chicago, IL (US); William Robert Gemza, Jr., Pearland, TX (US); Ryan Jerome Whalen, Oswego, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/870,181

(22) Filed: May 8, 2020

(65) Prior Publication Data

US 2020/0274890 A1    Aug. 27, 2020

Related U.S. Application Data

(63) Continuation of application No. 15/833,396, filed on Dec. 6, 2017, now Pat. No. 10,693,891.

(51) Int. Cl.
*G06F 21/00*     (2013.01)
*H04L 29/06*    (2006.01)
(Continued)

(52) U.S. Cl.
CPC ........ *H04L 63/1416* (2013.01); *G06F 21/554* (2013.01); *G06Q 10/107* (2013.01);
(Continued)

(58) Field of Classification Search
None
See application file for complete search history.

(56) References Cited

U.S. PATENT DOCUMENTS 7,302,706 B1    11/2007    Hicks
7,818,399 B1    10/2010    Ross, Jr. et al.
(Continued)

FOREIGN PATENT DOCUMENTS

WO    WO2016164844 A1    10/2016

OTHER PUBLICATIONS

"Email Forensic Software that is Fast, Accurate, and User-Friendly", Aid4Mail, Retrieved Dec. 5, 2017, 12 pages, https://www.aid4mail.com/email-forensics.
(Continued)

*Primary Examiner* — Maung T Lwin
(74) *Attorney, Agent, or Firm* — Lempia Summerfield Katz LLC

(57) ABSTRACT

A method includes, in response to receiving an email message, detecting one or more artifacts within an email message, wherein each of the artifacts is associated with a payload; for each artifact, generating, a descriptor object representing the artifact that does not include the payload, so that the processor is prevented from accessing the payload via the descriptor object; and at least one payload button based on the payload associated with the artifact for causing the payload to be transmitted to an external system for analysis of the payload; and presenting an artifact dashboard in a graphical user interface (GUI) rendered on a display of the email security system, the artifact dashboard displaying, for each artifact, the descriptor object representing the artifact and the at least one payload button based on the payload associated with the artifact.

22 Claims, 11 Drawing Sheets

(51) Int. Cl.
*H04L 12/58* (2006.01)
*G06F 21/55* (2013.01)
*G06Q 10/10* (2012.01)

(52) U.S. Cl.
CPC .............. *H04L 51/08* (2013.01); *H04L 51/12* (2013.01); *H04L 51/18* (2013.01); *H04L 63/1408* (2013.01); *H04L 63/1425* (2013.01)

(56) References Cited

U.S. PATENT DOCUMENTS

| | | | |
|---|---|---|---|
| 7,831,491 | B2 | 11/2010 | Newell et al. |
| 8,056,115 | B2 | 11/2011 | Treinen |
| 8,688,790 | B2 | 4/2014 | Levasseur |
| 9,047,441 | B2 | 6/2015 | Xie et al. |
| 9,245,114 | B2 | 1/2016 | Thomas |
| 9,246,933 | B1 | 1/2016 | Krishnappa |
| 9,288,220 | B2 | 3/2016 | Raugas et al. |
| 9,311,479 | B1 | 4/2016 | Manni et al. |
| 9,313,217 | B2 | 4/2016 | Arcamone et al. |
| 9,491,142 | B2 | 11/2016 | Xie et al. |
| 9,497,158 | B2 | 11/2016 | LeVasseur et al. |
| 9,654,492 | B2 | 5/2017 | Maylor et al. |
| 9,680,861 | B2 | 6/2017 | Ward et al. |
| 9,686,308 | B1 | 6/2017 | Srivastava |
| 9,912,698 | B1 * | 3/2018 | Thioux .................. H04L 63/20 |
| 2003/0097409 | A1 | 5/2003 | Tsai |
| 2003/0195934 | A1 | 10/2003 | Peterson |
| 2005/0096999 | A1 | 5/2005 | Newell et al. |
| 2005/0188222 | A1 * | 8/2005 | Motsinger ............... H04L 63/08 726/5 |
| 2005/0188423 | A1 * | 8/2005 | Motsinger ............... H04L 67/22 726/22 |
| 2006/0161988 | A1 | 7/2006 | Costea |
| 2007/0097976 | A1 * | 5/2007 | Wood .................. H04L 63/1416 370/392 |
| 2008/0141332 | A1 * | 6/2008 | Treinen ............... H04L 63/1416 726/1 |
| 2013/0326471 | A1 | 12/2013 | Nucci et al. |
| 2013/0340043 | A1 * | 12/2013 | Zarei ....................... G06F 21/31 726/4 |
| 2014/0122883 | A1 * | 5/2014 | LeVasseur ............ H04L 9/3213 713/170 |
| 2015/0100894 | A1 | 4/2015 | Kumar |
| 2015/0319136 | A1 | 11/2015 | Xie et al. |
| 2016/0127393 | A1 | 5/2016 | Aziz et al. |
| 2016/0226903 | A1 | 8/2016 | Arcamone et al. |
| 2016/0269422 | A1 | 9/2016 | McDougal |
| 2017/0039246 | A1 | 2/2017 | Bastide |
| 2017/0093771 | A1 | 3/2017 | Gatti et al. |
| 2017/0134402 | A1 | 5/2017 | Boivie |
| 2018/0278647 | A1 | 9/2018 | Gabaev |

OTHER PUBLICATIONS

"PhishAlarm and PhishAlarm Analyzer", Wombat Security Technologies, Retrieved Dec. 5, 2017, 5 pages, https://www.wombatsecurity.com/security-education/phishalarm-and-analyzer.
"PhishMe Triage, Phishing Incident Response Platform", PhishMe, Retrieved Dec. 5, 2017, 11 pages, https://phishme.com/product-services/triage/.
"PST File Viewer Tool", Freeviewer, Retrieved Dec. 5, 2017, 7 pages, https://www.freeviewer.org/pst/.
Extended European Search Report from, EP Application No. 18209258, dated Feb. 4, 2019, EP.
Examination Report from EP Application 18209258, dated Dec. 17, 2020, EP.

* cited by examiner

ELECTRONIC MAIL SECURITY SYSTEM

RELATED APPLICATIONS

This application is a continuation under 37 C.F.R. § 1.53(b) of U.S. patent application Ser. No. 15/833,396 filed Dec. 6, 2017 now U.S. Pat. No. 10,693,891, the entire disclosure of which is hereby incorporated by reference.

TECHNICAL FIELD

The disclosure relates to malware detection systems and, more specifically, to identification and investigation of malicious artifacts in electronic communications wherein execution thereof within an email system is prevented and/or controlled.

BACKGROUND

The use of electronic mail (email) as a communications tools has proliferated over recent years. Due to its widespread use and popularity, email has become a target for spreading malicious software (malware). Malware may include software used to disrupt computer operations, gather sensitive information stored on computers, or gain access to private computer systems and networks. Malware may be any code that is surreptitiously provided to a user or which otherwise performs undisclosed/unauthorized functions. An email message containing malware or virus program can infect the recipient's computing device, as well as other computers and servers on the same network as the infected computing device. To prevent malware/virus attacks, recipients of suspicious email messages are encouraged to report such email messages to system administrators. System administrators are tasked with investigating, diagnosing and processing suspicious email messages in order to determine if they are legitimate or not, and, in the case of an illegitimate email message, to implement remedial measures, such as to prevent similar email messages from being received. A prior approach to analyzing suspicious email messages involves use of different tools to examine the contents, or specific portions thereof, of an email message, such as a web page, email message, file or universal resource locator included in the email message contents, often using a sandbox or isolated environment in order to prevent any active elements from being able to be effective.

DETAILED DESCRIPTION

Figure 1:
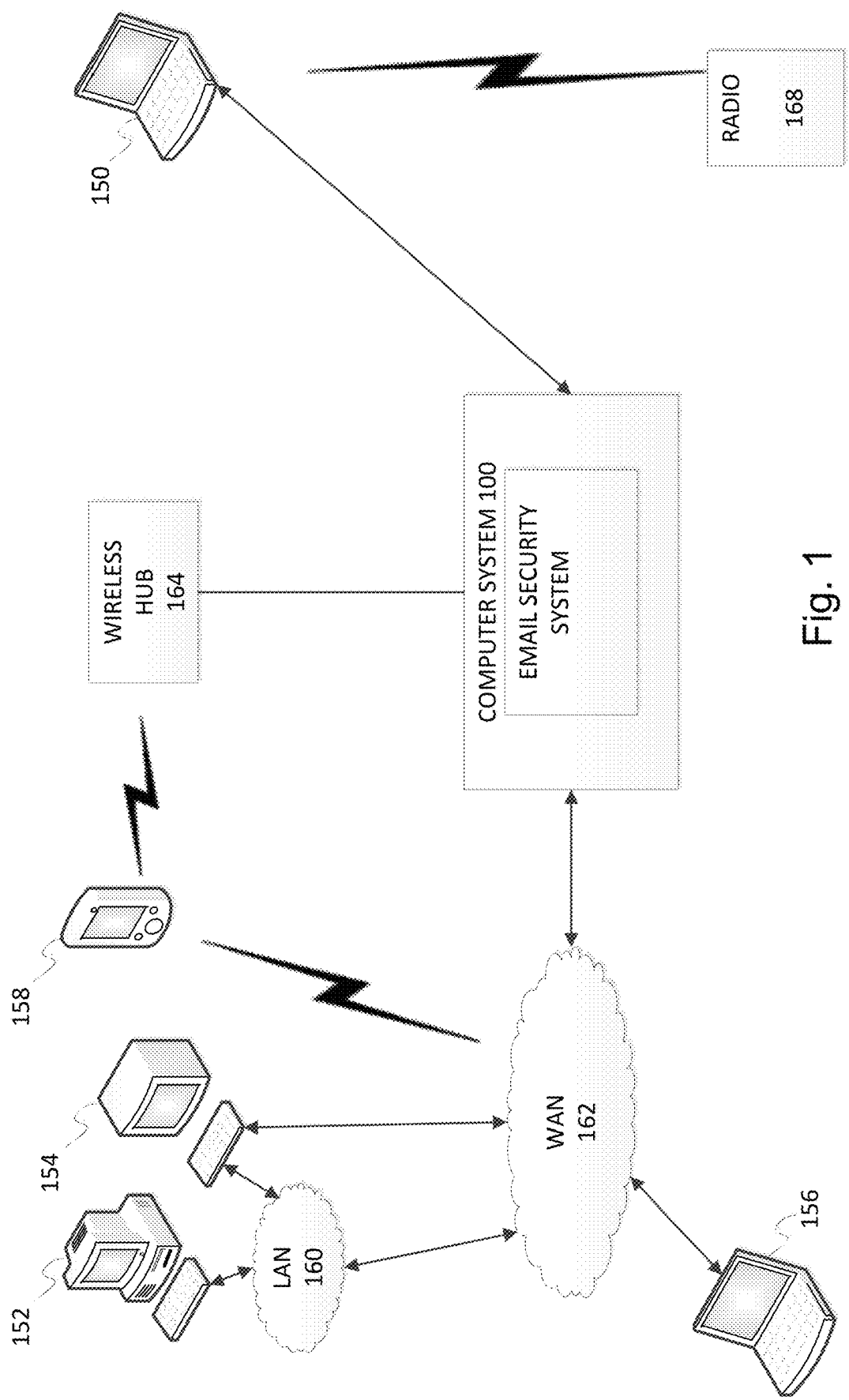
FIG. 1 depicts a computer network system, according to some embodiments.

The disclosed systems and methods generally enable an administrator to safely examine email messages, including their contents, and in particular, to identify, but disable execution of, potentially malicious artifacts (e.g., Internet links, attachments, macros, headers) in an email message, and easily and conveniently investigate/handle each artifact. The disclosed email security system acts as an intermediary between an administrator user and an email message and modifies how an administrator interacts with the email message and manages how the email message may interact with the computer executing the disclosed email security system and its software, e.g., the system causes interactions with email messages to be manipulated to yield a desired result, namely, that all of the artifacts in an email message that could be malware are identified but disabled, and are further associated with a payload button for investigating the artifact. The email security system overrides the routine and conventional sequence of events ordinarily triggered by opening up an email message, clicking Internet hyperlinks and/or opening/inspecting attachments. The email security system changes the normal operation of an email message by decomposing the email message into its constituent parts, segregating any artifacts included therein and directing the administrator to an Artifact Dashboard that presents the artifacts of an email message (via descriptor objects) as well as payload buttons for investigating and processing each artifact's payload.

In one embodiment, the Artifact Dashboard is directly accessible via a button on the email client, such as Microsoft Outlook®. The Artifact Dashboard is integrated with the email client, and suspicious email messages received via the email client can be analyzed, classified and handled directly from the email client. The disclosed system accordingly facilitates administrator/analyst investigations by providing a safe and efficient application/framework/dashboard without needing to access disparate tools (which could lead to a disorganized/non-standardized workflow) to handle an email message that is received in the email client.

Because there are many legitimate uses for non-malicious artifacts, e.g., colleagues emailing each other attachments related to a work project, simply blocking all artifacts from all email messages is not possible or helpful. Moreover, it is often difficult to distinguish malicious from non-malicious artifacts. The email security system removes the interactivity associated with an artifact, and instead automatically decomposes and presents an artifact in an inert form without its associated payload. The email security system is a technology-based solution of analyzing suspicious email messages received over the Internet or other network that overcomes the risks, inconveniences and increased likelihood of error associated with existing systems.

Malware may be present on Internet webpages (accessible via Internet links) or in attachments. Some prior art systems disclose analyzing potential malware samples using secure isolated environments, such as sandboxes or virtual machines. See, e.g., U.S. Patent Publication Nos. 2017/0243000, 2017/0134402, 2016/0127393, 2015/0319136, and U.S. Pat. Nos. 9,106,694, and 9,047,441. For example, Internet links and/or attachments can be analyzed for suspicious content using secure sandboxed/virtual machine environments.

An unscrupulous email message can also be detected using email message headers. US20170093771 describes analyzing/reading Internet message headers of email messages to identify the source of the email message and determining if the email messages pose a threat or are otherwise malicious based on the source of the email messages.

While the administrator computer preferably accesses the email security system directly from main memory or local storage, the email security system may, alternatively, be located remotely, e.g., on a server, and be accessed through the Internet or a separate computer network connecting the administrator computer to the email security system. In one embodiment, the systems and methods may be implemented at an email server before the email message is received by the recipient computer coupled therewith.

The disclosed embodiments may be implemented in a computing system and network. An exemplary network environment for implementing the disclosed systems and methods is shown in FIG. 1. A computer system 100 may be coupled to computer devices 150, 152, 154, 156 and 158 over a wide area network 162 and/or local area network 160.

Herein, the phrase "coupled with" is defined to mean directly connected to or indirectly connected through one or more intermediate components. Such intermediate components may include both hardware and software based components. Further, to clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

Figure 2:
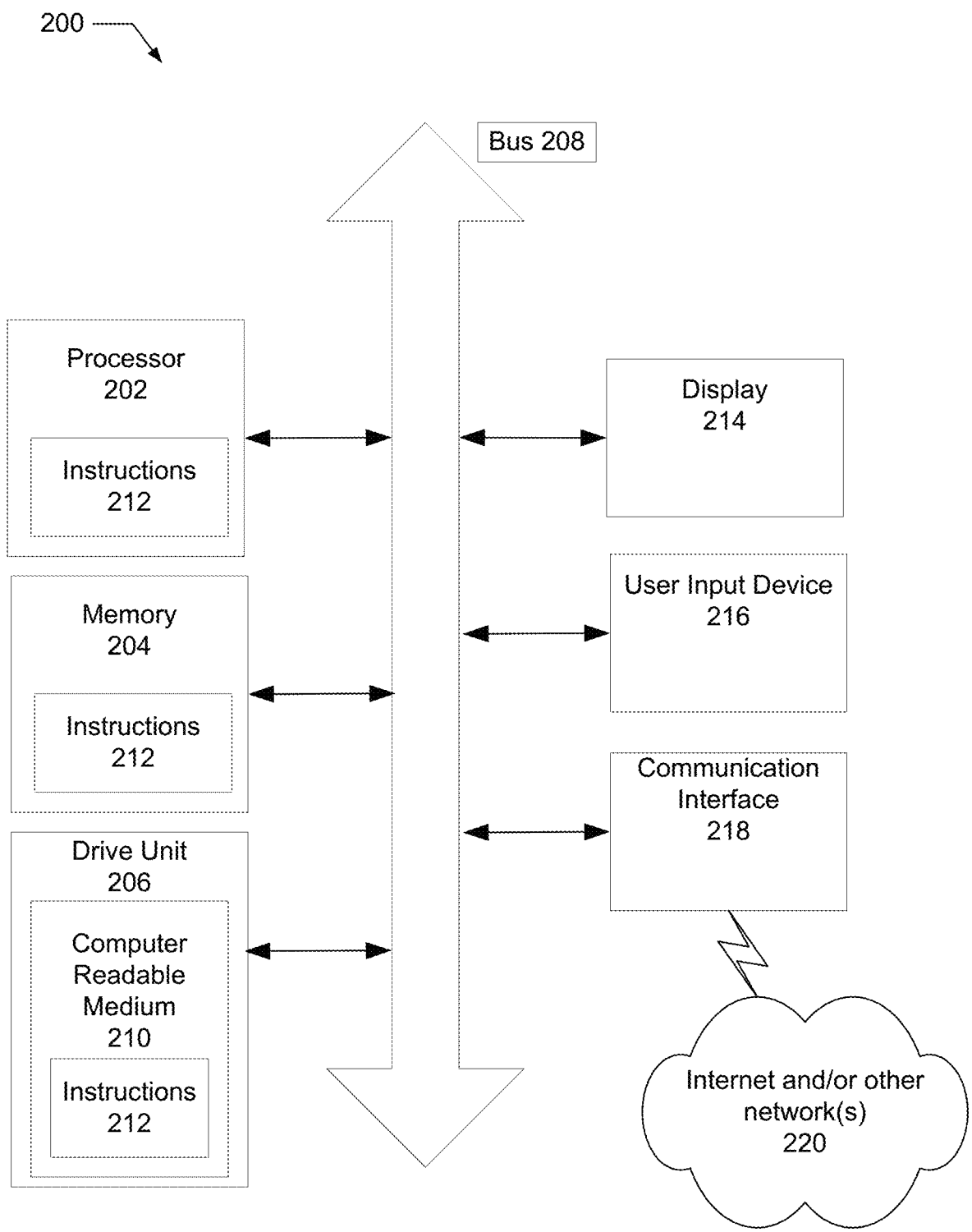
FIG. 2 depicts a general computer system, according to some embodiments.

The computer system 100 may be implemented with one or more mainframe, desktop or other computers, such as the example computer 200 described herein with respect to FIG. 2.

One skilled in the art will appreciate that the methods described herein may be implemented using, among other things, a tangible computer-readable medium comprising computer-executable instructions (e.g., executable software code). Alternatively, the methods may be implemented as software code, firmware code, specifically configured hardware or processors, and/or a combination of the aforementioned. As described herein, the disclosed embodiments may be implemented as a centrally accessible system or as a distributed system, e.g., where some of the disclosed functions are performed by different computer systems.

The network environment shown in FIG. 1 includes exemplary computer devices 150, 152, 154, 156 and 158 which depict different exemplary methods or media by which a computer device may be coupled with the computer system 100 or by which a user may communicate. It should be appreciated that the types of computer devices deployed by users and the methods and media by which they communicate with the computer system 100 is implementation dependent and may vary and that not all of the depicted computer devices and/or means/media of communication may be used and that other computer devices and/or means/media of communications, now available or later developed may be used. Each computer device, which may comprise a computer 200 described in more detail with respect to FIG. 2, may include a central processor, specifically configured or otherwise, that controls the overall operation of the computer and a system bus that connects the central processor to one or more conventional components, such as a network card or modem. Each computer device may also include a variety of interface units and drives for reading and writing data or files and communicating with other computer devices and with the computer system 100. Depending on the type of computer device, a user can interact with the computer with a keyboard, pointing device, microphone, pen device or other input device now available or later developed.

An exemplary computer device 150 is shown directly connected to computer system 100, such as via a T1 line, a common local area network (LAN) or other wired and/or wireless medium for connecting computer devices, such as the network 220 shown in FIG. 2 and described with respect thereto. The exemplary computer device 150 is further shown connected to a radio 168. The user of radio 168, which may include a cellular telephone, smart phone, or other wireless proprietary and/or non-proprietary device. The radio user may transmit orders or other information to the exemplary computer device 150 or a user thereof. The user of the exemplary computer device 150, or the exemplary computer device 150 alone and/or autonomously, may then transmit the information to the computer system 100.

Exemplary computer devices 152 and 154 are coupled with a local area network ("LAN") 160 which may be configured in one or more of the well-known LAN topologies, e.g., star, daisy chain, etc., and may use a variety of different protocols, such as Ethernet, TCP/IP, etc. The exemplary computer devices 152 and 154 may communicate with each other and with other computer and other devices which are coupled with the LAN 160. Computer and other devices may be coupled with the LAN 160 via twisted pair wires, coaxial cable, fiber optics or other wired or wireless media. As shown in FIG. 1, an exemplary wireless personal digital assistant device ("PDA") 158, such as a mobile telephone, tablet based compute device, or other wireless device, may communicate with the LAN 160 and/or the Internet 162 via radio waves, such as via WiFi, Bluetooth and/or a cellular telephone based data communications protocol. PDA 158 may also communicate with computer system 100 via a conventional wireless hub 164.

FIG. 1 also shows the LAN 160 coupled with a wide area network ("WAN") 162 which may be comprised of one or more public or private wired or wireless networks. In one embodiment, the WAN 162 includes the Internet 162. The LAN 160 may include a router to connect LAN 160 to the Internet 162. Exemplary computer device 156 is shown coupled directly to the Internet 162, such as via a modem, DSL line, satellite dish or any other device for connecting a computer device to the Internet 162 via a service provider therefore as is known. LAN 160 and/or WAN 162 may be the same as the network 220 shown in FIG. 2 and described with respect thereto.

The operations of computer devices and systems shown in FIG. 1 may be controlled by computer-executable instructions stored on a non-transitory computer-readable medium.

Numerous additional servers, computers, handheld devices, personal digital assistants, telephones and other devices may also be connected to computer system 100. Moreover, one skilled in the art will appreciate that the topology shown in FIG. 1 is merely an example and that the components shown in FIG. 1 may include other components not shown and be connected by numerous alternative topologies.

Referring now to FIG. 2, an illustrative embodiment of a general computer system 200 is shown. The computer system 200 can include a set of instructions that can be executed to cause the computer system 200 to perform any one or more of the methods or computer based functions disclosed herein. The computer system 200 may operate as a standalone device or may be connected, e.g., using a network, to other computer systems or peripheral devices. Any of the components discussed herein, such as processor 202, may be a computer system 200 or a component in the computer system 200.

In a networked deployment, the computer system 200 may operate in the capacity of a server or as a client user computer in a client-server user network environment, or as a peer computer system in a peer-to-peer (or distributed) network environment. The computer system 200 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 200 can be implemented using electronic devices that provide voice, video or data communication. Further, while a single computer system 200 is illustrated, the term "system" shall also be taken to include any collection of systems or sub-systems that individually or jointly execute a set, or multiple sets, of instructions to perform one or more computer functions.

As illustrated in FIG. 2, the computer system 200 may include a processor 202, e.g., a central processing unit (CPU), a graphics processing unit (GPU), or both. The processor 202 may be a component in a variety of systems. For example, the processor 202 may be part of a standard personal computer or a workstation. The processor 202 may be one or more general processors, digital signal processors, specifically configured processors, application specific integrated circuits, field programmable gate arrays, servers, networks, digital circuits, analog circuits, combinations thereof, or other now known or later developed devices for analyzing and processing data. The processor 202 may implement a software program, such as code generated manually (i.e., programmed).

The computer system 200 may include a memory 204 that can communicate via a bus 208. The memory 204 may be a main memory, a static memory, or a dynamic memory. The memory 204 may include, but is not limited to, computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 204 includes a cache or random access memory for the processor 202. In alternative embodiments, the memory 204 is separate from the processor 202, such as a cache memory of a processor, the system memory, or other memory. The memory 204 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 204 is operable to store instructions executable by the processor 202. The functions, acts or tasks illustrated in the figures or described herein may be performed by the programmed processor 202 executing the instructions 212 stored in the memory 204. The functions, acts or tasks are independent of the particular type of instructions set, storage media, processor or processing strategy and may be performed by software, hardware, integrated circuits, firm-ware, microcode and the like, operating alone or in combination. Likewise, processing strategies may include multiprocessing, multitasking, parallel processing and the like.

As shown, the computer system 200 may further include a display unit 214, such as a liquid crystal display (LCD), an organic light emitting diode (OLED), a flat panel display, a solid state display, a cathode ray tube (CRT), a projector, a printer or other now known or later developed display device for outputting determined information. The display 214 may act as an interface for the user to see the functioning of the processor 202, or specifically as an interface with the software stored in the memory 204 or in the drive unit 206.

Additionally, the computer system 200 may include an input device 216 configured to allow a user to interact with any of the components of system 200. The input device 216 may be a number pad, a keyboard, or a cursor control device, such as a mouse, or a joystick, touch screen display, remote control or any other device operative to interact with the system 200.

In a particular embodiment, as depicted in FIG. 2, the computer system 200 may also include a disk or optical drive unit 206. The disk drive unit 206 may include a computer-readable medium 210 in which one or more sets of instructions 212, e.g., software, can be embedded. Further, the instructions 212 may embody one or more of the methods or logic as described herein. In a particular embodiment, the instructions 212 may reside completely, or at least partially, within the memory 204 and/or within the processor 202 during execution by the computer system 200. The memory 204 and the processor 202 also may include computer-readable media as discussed herein.

The present disclosure contemplates a computer-readable medium that includes instructions 212 or receives and executes instructions 212 responsive to a propagated signal, so that a device connected to a network 220 can communicate voice, video, audio, images or any other data over the network 220. Further, the instructions 212 may be transmitted or received over the network 220 via a communication interface 218. The communication interface 218 may be a part of the processor 202 or may be a separate component. The communication interface 218 may be created in software or may be a physical connection in hardware. The communication interface 218 is configured to connect with a network 220, external media, the display 214, or any other components in system 200, or combinations thereof. The connection with the network 220 may be a physical connection, such as a wired Ethernet connection or may be established wirelessly. Likewise, the additional connections with other components of the system 200 may be physical connections or may be established wirelessly.

The network 220 may include wired networks, wireless networks, or combinations thereof. The wireless network may be a cellular telephone network, an 802.11, 802.16, 802.20, or WiMax network. Further, the network 220 may be a public network, such as the Internet, a private network, such as an intranet, or combinations thereof, and may utilize a variety of networking protocols now available or later developed including, but not limited to, TCP/IP based networking protocols.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated or otherwise specifically configured hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

As used herein, the terms "microprocessor" or "general-purpose processor" ("GPP") may refer to a hardware device that fetches instructions and data from a memory or storage device and executes those instructions (for example, an Intel Xeon processor or an AMD Opteron processor) to then, for example, process the data in accordance therewith. The term "reconfigurable logic" may refer to any logic technology whose form and function can be significantly altered (i.e., reconfigured) in the field post-manufacture as opposed to a microprocessor, whose function can change post-manufacture, e.g. via computer executable software code, but whose form, e.g. the arrangement/layout and interconnection of logical structures, is fixed at manufacture. The term "software" may refer to data processing functionality that is deployed on a GPP. The term "firmware" may refer to data processing functionality that is deployed on reconfigurable logic. One example of a reconfigurable logic is a field programmable gate array ("FPGA") which is a reconfigurable integrated circuit. An FPGA may contain programmable logic components called "logic blocks", and a hierarchy of reconfigurable interconnects that allow the blocks to be "wired together", somewhat like many (changeable) logic gates that can be inter-wired in (many) different configurations. Logic blocks may be configured to perform complex combinatorial functions, or merely simple logic gates like AND, OR, NOT and XOR. An FPGA may further include memory elements, which may be simple flip-flops or more complete blocks of memory.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well. Feedback provided to the user can be any form of sensory feedback, e.g., visual feedback, auditory feedback, or tactile feedback. Input from the user can be received in any form, including acoustic, speech, or tactile input.

Embodiments of the subject matter described in this specification can be implemented in a computing system that includes a back end component, e.g., a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

It should be appreciated that the disclosed embodiments may be applicable to other types of messages depending upon the implementation. Further, the messages may comprise one or more data packets, datagrams or other collection of data formatted, arranged configured and/or packaged in a particular one or more protocols, e.g., the FIX protocol, TCP/IP, Ethernet, etc., suitable for transmission via a network 214 as was described, such as the message format and/or protocols described in U.S. Pat. No. 7,831,491 and U.S. Patent Publication No. 2005/0096999 A1, both of which are incorporated by reference herein in their entireties and relied upon. Further, the disclosed message management system may be implemented using an open message standard implementation, such as FIX, FIX Binary, FIX/FAST, or by an exchange-provided API.

Figure 3:
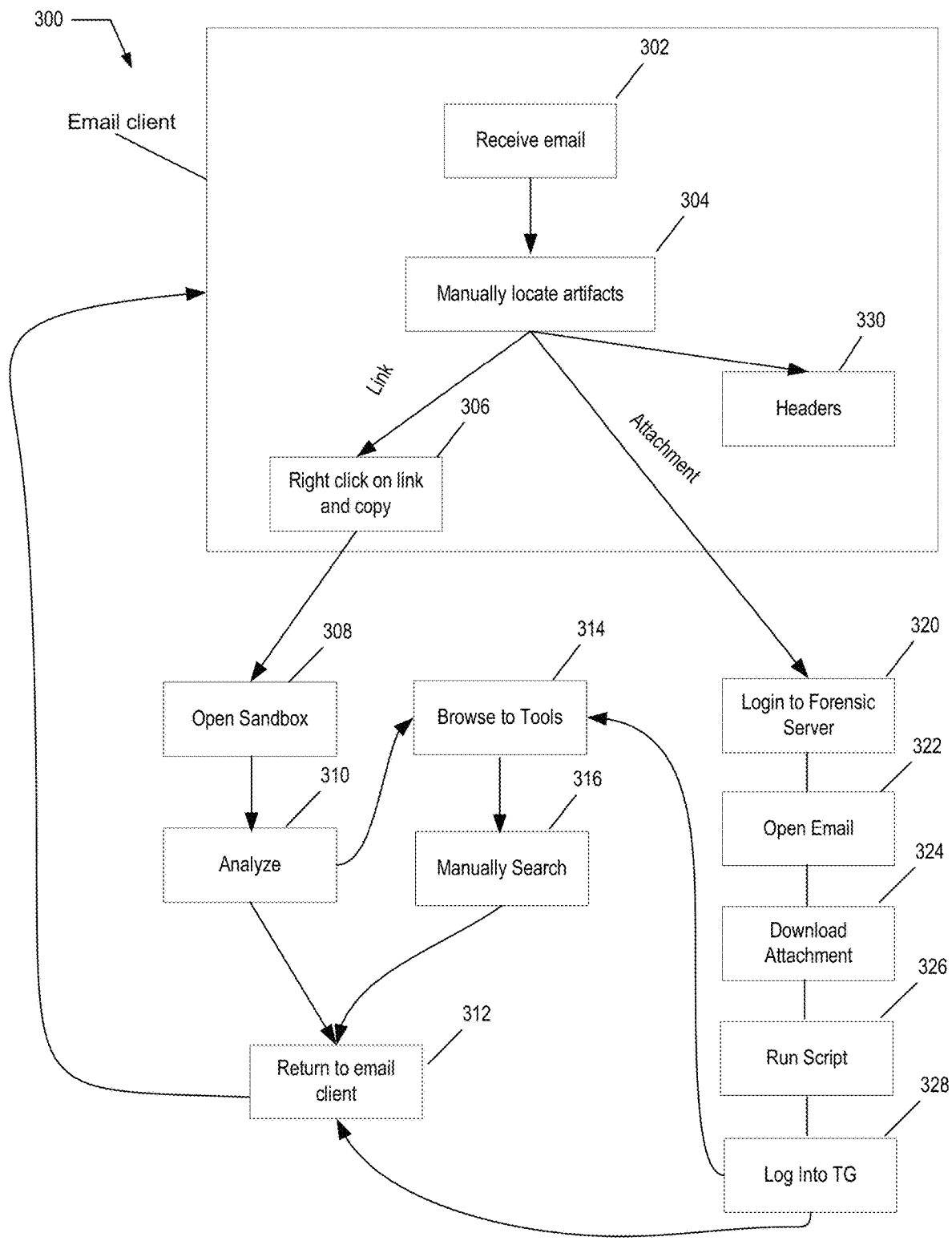
FIG. 3 depicts an example workflow for processing email messages potentially containing malware.

Referring now to FIG. 3, FIG. 3 illustrates an example workflow 300 that an administrator may execute using a computer upon receiving an email message suspected of containing malware. For example, a system administrator may receive an email message that is suspected to be, include links to, or contain malware (step 302). The email message may be forwarded to the administrator from a sender, who may have received the email message from another entity. For example, the administrator may be responsible for inspecting email messages received by the sender and for safeguarding the sender's computer system.

The administrator may then manually locate artifacts within the email message that may be, link to, or contain malware (step 304). For example, the email message may include artifacts such as Internet links within the body of the email message that, if clicked, access a malicious website, or attachments that, if clicked or executed, harm the computer or perform an otherwise malicious action. Some email clients are configured to detect Internet links and format them so they appear to be underlined for ease of identification by a user. However, many email clients cannot detect all Internet links, and some text can be configured to prevent detection by email clients. Moreover, an email message may contain non-Internet link text that is also underlined, thus simply locating underlined text does not lead to locating all Internet links. In addition, hypertext markup language (HTML) allows the display text and the underlying link to be different. Accordingly, some Internet links may be disguised, e.g., the display text may appear to be one URL (e.g., a safe website) but the actual underlying link that is opened in the browser upon interacting with the display text may be, or link or malware. The administrator may need to visually inspect the text, or the underlying html code for indicators (such as www, .com, .org, .net, http://, https://, etc.) signaling that the email message contains an Internet link. The administrator may also hover over text (i.e., position the mouse cursor over text without clicking on the text) to confirm if text is an Internet link that, if clicked, will access the Internet using the computer's Internet browser, because some email clients are configured to display a full Internet address upon hovering over an Internet link. In one embodiment, the email security system identifies all underlying Internet links, regardless of what the display text is for an Internet link. In one embodiment, the Artifact Dashboard discussed below displays both the display text of the Internet link and the underlying link code of the Internet link.

For each Internet link that is identified by the administrator, the administrator copies the Internet link (step 306) using a user interface device, which enables a copy function of the administrator's computer, so that the copied text can be stored in a temporary memory or buffer and pasted into a different application. As is known in the art, cut, copy and paste are common computer functions that allow a user to manipulate text and/or files in a computer environment. These computer functions allow the user to easily copy or move data between one application and another or copy and move files and directories from one location to another. For example, copied text or files may be stored in a temporary copy buffer. After the copied text or file is pasted, or otherwise used, in another application or location, the temporary buffer contents may be emptied.

The user interface device may be a mouse, or may be a touchscreen controlled by finger gestures by a user. The administrator must be sure to only copy, and not click on or activate, the Internet link using the user interface device. Clicking on, instead of copying, the Internet link could be a dangerous act that could compromise the administrator's computer and/or network. After copying the Internet link, the administrator may open up a separate sandbox tool or environment (step 308) and paste the Internet link in the separate tool to check whether the Internet link causes harmful/malicious effects. A sandbox tool or environment on a computer allows a user to open up or test an application or browser in an isolated environment, so that any changes to the isolated environment are prevented from affecting the rest of the computer, and all changes/downloads associated with the sandboxed application are removed from the computer when the sandbox tool is closed or exited. A sandbox may be a separate server that the administrator needs to access.

The administrator analyzes the Internet link in the sandbox to check the effects, including any malicious activity, of the Internet link (310). Any malware that might have been downloaded and installed from the Internet link is discarded when the sandbox is exited. The administrator may then return (312) to the email client or to some other application, such as a notes or text editor, to document information about the Internet link.

The administrator may also access tools (step 314) that maintain lists of Internet links known to be malicious. The administrator only has to paste the suspicious Internet link into such a tool to determine if the Internet link is known to be a malicious website. Such tools thus allow the administrator to determine if the Internet link is malicious without having to even open it, e.g., in a sandbox environment. Upon searching the tool for the target Internet link (step 316), the administrator may return (312) to the email client or to a notes or text editor to document information about the Internet link.

If the email message contains attachments, the administrator may log in to a separate forensic server (step 320) to examine the attachment. Logging into the forensic server requires the administrator to leave the email client. The forensic server may be similar to the sandbox discussed above, but may allow additional examining capabilities. In the forensic server, the administrator opens the email (step 322), downloads the attachment (step 324), and runs a script (step 326) to examine the nature and the effects of the email message attachment. The administrator may also log into ThreatGuard® (step 328) to examine the attachment. Attachments may also be checked in a variety of different tools that maintain lists of malicious attachments (steps 314 and 316).

Figure 10:
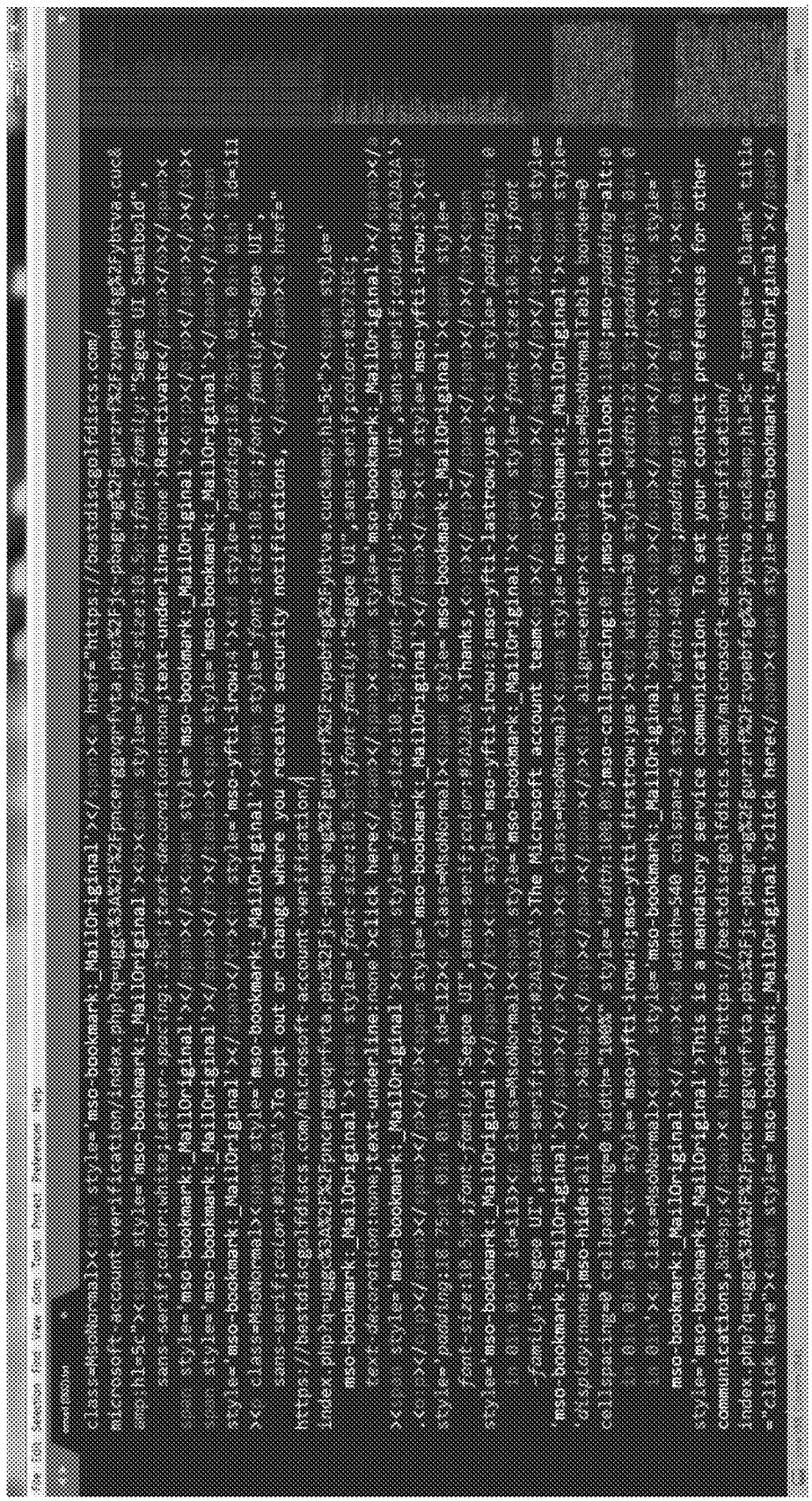
FIG. 10 illustrates an example screenshot of an email message source code.

The administrator then returns (312) to the email client or to a notes or text editor to document information about the attachment. The administrator may also open up the header of the email message (step 330), e.g., through the email client's menu options, to detect spoofing attempts. Or, the administrator may determine if the Internet header of an email message is a known malware source. An email client may allow the administrator to manually view the source of an email message to determine if the email message may contain malware. For example, FIG. 10 illustrates an example screen shot of a source screen 1000 presented by an email client when the administrator uses the email client to view the source of an email message. The administrator manually inspects the contents of the source screen to attempt to determine the originator of the email, any Internet links in the email message, and any other artifact information about the email message.

The administrator may then manually categorize the email message (e.g., malicious, non-malicious, phishing, phishing test, spam, marketing) and send the email message submitter instructions for how to handle the email message.

Process 300 is inefficient because the administrator may need to access and utilize several different tools and secure servers just to respond to one email message. In cases where an email message includes multiple artifacts, the administrator has to manually keep track of each artifact, and address/consider each artifact before categorizing the email message and responding to the email message sender. An administrator could easily forget to check each artifact. Or, the administrator could fail to perform each of the steps for an artifact. For example, process 300 requires the administrator to open an Internet link in a sandbox, and check the Internet link against a known list of malicious Internet links. It should be appreciated that an administrator may overlook one of the recommended steps when analyzing an email message that includes many, e.g., dozens of Internet links.

Process 300 is also cumbersome for an administrator. Analyzing an artifact typically requires the administrator to open up a separate application, window or tool on the administrator's computer. In some cases, the administrator's computer screen may simultaneously display overlapping header windows, browsers, sandbox environments, virtual environments, and/or server access tools along with the email client and the email message being checked, resulting in a confusing and overwhelming user environment that may be susceptible to user confusion and error. For example, Microsoft Outlook's® header view is a small window that makes reading header information difficult.

Process 300 is also potentially dangerous because the administrator could, while copying a link or attachment, accidentally open the link or attachment and expose the administrator's computer to malware.

The disclosed email security system automatically identifies artifacts (e.g., Internet links, attachments and headers) from an email message, and displays descriptor objects of the artifacts to the administrator in a single window that preserves all of the relevant information along with associated action/payload buttons for managing various artifacts, while removing the functionality (e.g., payload) associated with an artifact. The payload buttons allow the administrator to process the artifact. The system removes the ability to execute/open any of the identified artifacts, thus eliminating the risk of infecting the administrator's computer. The tools invoked for, and actions performed on, an artifact's payload may be customizable by the administrator, increasing the flexibility and convenience of the email security system.

The system also allows administrators to categorize email messages, and send standard replies (based on templates) to the email message submitter containing instructions for how to handle the email message, based on the categorization.

The email security system automatically parses a suspicious/target email message and detects and identifies content within the email message, or attributes of the email message, and presents information about the email message in an Artifact Dashboard. The administrator can configure conditions that if met, determine whether email message content is identified as an artifact. For example, the email security system may be configured to automatically identify any text or underlying code beginning with "www" and ending with ".com" as an Internet link. In one embodiment, the email security system may automatically identify Uniform Resource Locator links (URLs) as Internet links.

The email security system can also use information from the email client to determine, for example, that an email message includes an attachment. In one embodiment, any attachment to the email message may be deemed an artifact, which is then processed/handled as discussed herein.

Figure 4:
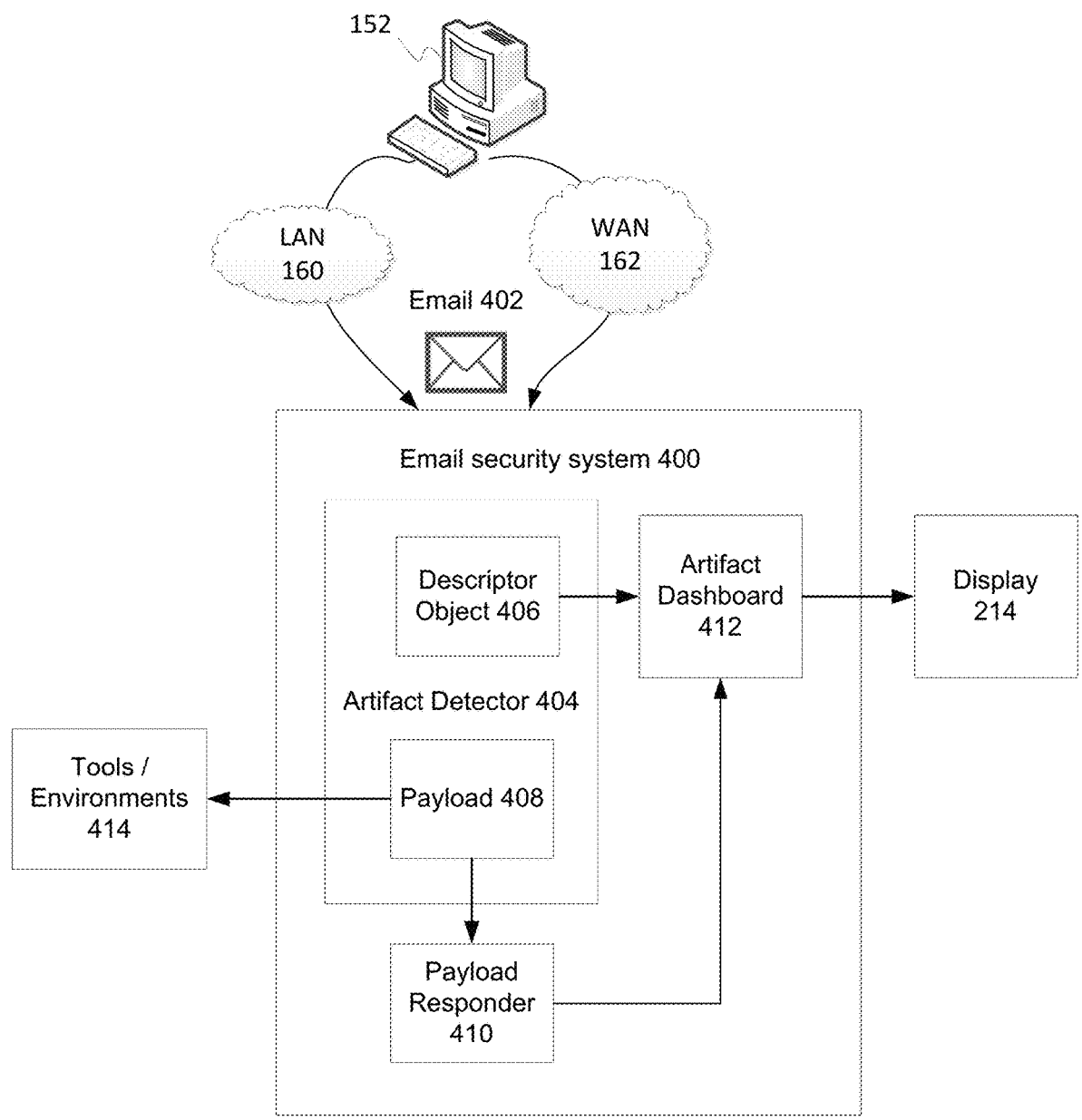
FIG. 4 depicts an example block diagram of an email security system, according to some embodiments.

FIG. 4 block diagram illustrates an example email security system 400 that receives an email message 402 from a client computer 152. The client computer 152's user may suspect the email message 402 to contain malware. The email security system 400 may be used by an administrator to determine whether the email message 402 contains malware and appropriately handle the potential malware threat.

Email security system 400 includes artifact detector 404, which may be implemented as a separate component or as one or more logic components, such as on an FPGA which may include a memory or reconfigurable component to store logic and processing component to execute the stored logic, e.g. computer program logic, stored in a memory 204, or other non-transitory computer readable medium, and executable by a processor 202, such as the processor 202 and memory 204 described with respect to FIG. 2, to cause the processor 202 to identify artifacts such as Internet links, attachments, headers, macros, executable code, etc. For example, the artifact detector 404 may be configured to scan the email message and identify artifacts based on programmed rules, e.g., that an Internet link begins with text "www". Or, the artifact detector 404 may be in communication with the email client that receives the email message 402 and receive information about attachments to the email message 402.

As discussed herein, each artifact carries with it the potential to harm the resident computer. Each artifact may be actionable, accessible or executable by a user of the computer using, for example, a user input device. Generally, the user may be able to perform some act or event on the artifact, or interact with the artifact. For example, if the artifact is an Internet link, the user may be able to click on, or touch (depending on the user input device), the Internet link. If the artifact is an attachment (e.g., Microsoft Word® file), the user may be able to double-click on, or touch (again, depending on the user input device), the attachment. Upon interacting with the artifact, the artifact causes another act or event to occur. For example, interacting with an Internet link on a computer may cause the computer to open or access an Internet website in the computer's browser, or download content to the computer. Or, interacting with an attachment may cause the computer to open up the attachment in some other program. If the website that is opened, or the attachment that is opened, are or contain malware, the web site or attachment may then download harmful files to the computer, or cause other undesirable actions to be automatically performed on the computer (such as, for example, sending information about the recipient's computer, such as an Internet protocol (IP) address, to another location without the recipient's knowledge, consent, or approval).

The result of interacting with the artifact may be termed a payload. Thus, each artifact is associated with a payload, which is a result of activating, accessing, executing and/or interacting with an artifact. If the artifact is an Internet link, the payload is the address of the resultant website that is opened via the computer's browser upon clicking on/touching the Internet link, or the resultant content which is downloaded to the computer upon interfacing with the link, such as an image or file. In one embodiment, the payload may cover any additional actions that are performed (e.g., automatic download of trackers or other harmful files, e.g., spyware) automatically upon opening the resultant website.

An attachment artifact may have a payload that is an executable file (i.e., ending in ".exe") for the recipient computer's operating system. Interacting with the attachment could execute the payload executable file. An attachment artifact may have a payload that contains a macro (e.g., a Word document with an embedded Visual Basic® macro, etc.).

The artifact detector 404 may be configured to generate a descriptor object 406 of each artifact, which is separate from the payload 408. For example, the descriptor object could be the name or title of the Internet link or attachment as it appears in the email message. The descriptor object functions to identify and represent the artifact, but does not include the payload functionality and cannot be interacted with.

In one embodiment, the artifact detector 404 separates or divides an artifact into a payload and a descriptor object. The artifact detector 404 may also store the payload and the descriptor object in separate data structures in memory. The separate data structures are then accessed by the email security system 400 when the Artifact Dashboard is presented on the display, as discussed below.

When the descriptor object is displayed on a display unit e.g., via an Artifact Dashboard, described below, the descriptor object may appear to look similar to the corresponding artifact. A user, e.g., administrator, may view the descriptor object which appears just like the corresponding artifact, but is prevented from interacting with the descriptor object and causing the results thereof, i.e., cannot result in the payload.

Email security system 400 includes payload responder 410, which may be implemented as a separate component or as one or more logic components, such as on an FPGA which may include a memory or reconfigurable component to store logic and processing component to execute the stored logic, e.g. computer program logic, stored in a memory 204, or other non-transitory computer readable medium, and executable by a processor 202, such as the processor 202 and memory 204 described with respect to FIG. 2, to cause the processor 202 to generate a payload button based on the payload.

The payload responder 410 is configurable by the administrator to perform an action on the payload. For example, the payload responder 410 may provide action/payload buttons that correspond to actions that the administrator can perform on the payload. For example, if the artifact is an Internet link, and its payload is a URL/address, the payload responder 410 may provide one button for each action that can be performed on the URL. The email security system may be programmed to provide one button that, upon being clicked, causes the URL to be opened in a sandbox environment, and another button that, upon being clicked, causes the URL to be transmitted to a tool that maintains a list of malware URLs and checks whether the payload URL appears on the tool's list. The administrator can interact with the buttons, but not the payload associated with the buttons. The administrator only needs to interact with the buttons generated by the payload responder 410, but does not need to interact with the payload itself, thus insulating the administrator's computer from the effects of the artifact/payload.

The email security system 400 does not merely filter or quarantine artifacts, but instead detects artifacts, separates the payload so it is not actionable, an selectively transmits the actionable payload upon user selection of a payload button for that artifact.

Email security system 400 may also be in communication with display unit 214. Email security system 400 combines information and visual elements from the descriptor object 406 and payload responder 410 to generate an Artifact Dashboard 412 that is presented on the display unit 214. The Artifact Dashboard displays the descriptor objects 406 and payload responders 410 for each artifact.

Email security system 400 may also be in communication with tools/environments 414, which may include sandbox environments, Internet link testing tools, and/or virtual machines. Upon a user interacting with a payload responder 410, the email security system transmits the payload 408 to the tools/environment 414.

Figure 5A:
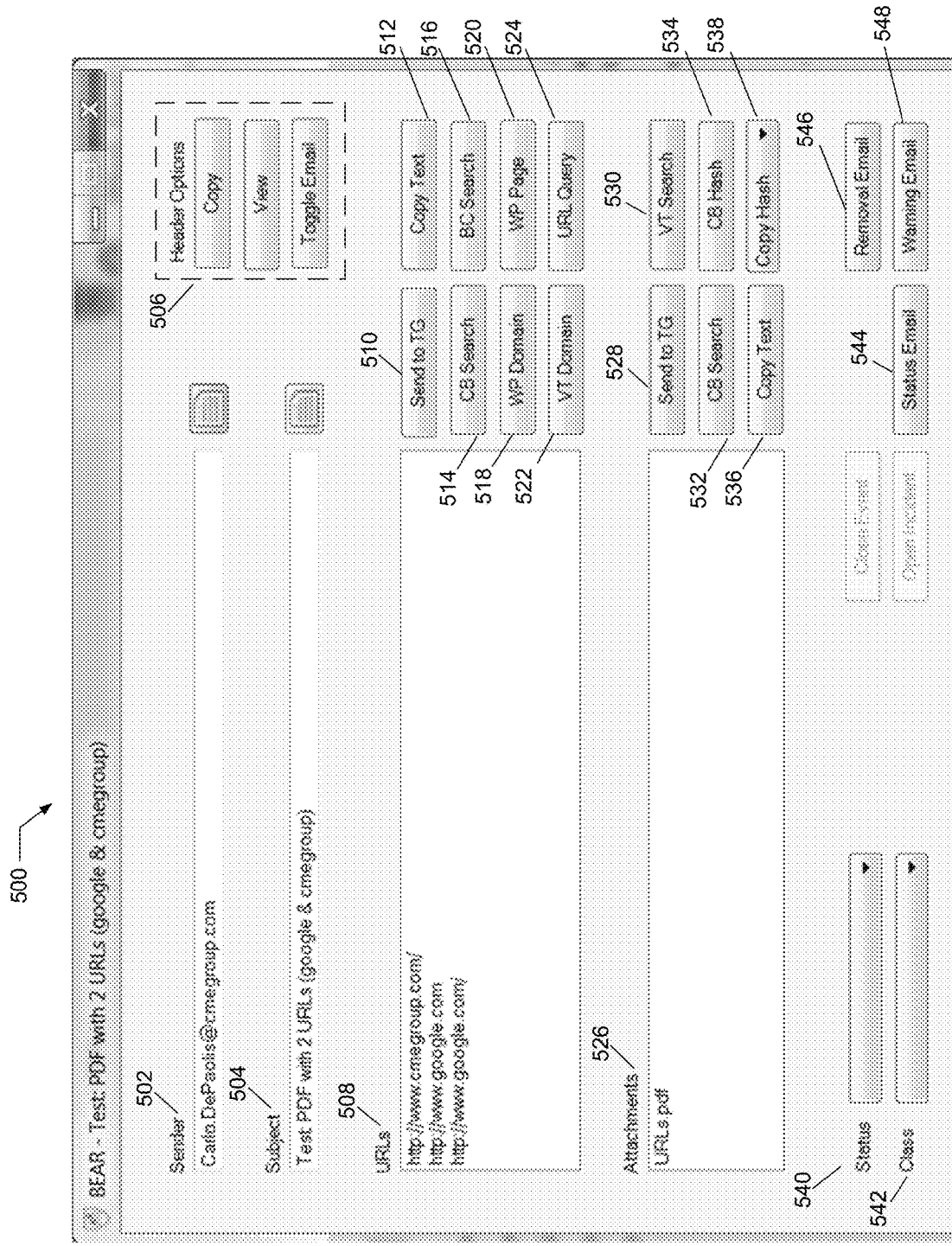
FIG. 5A depicts an example Artifact Dashboard presented by the email security system, according to some embodiments.
Figure 9:
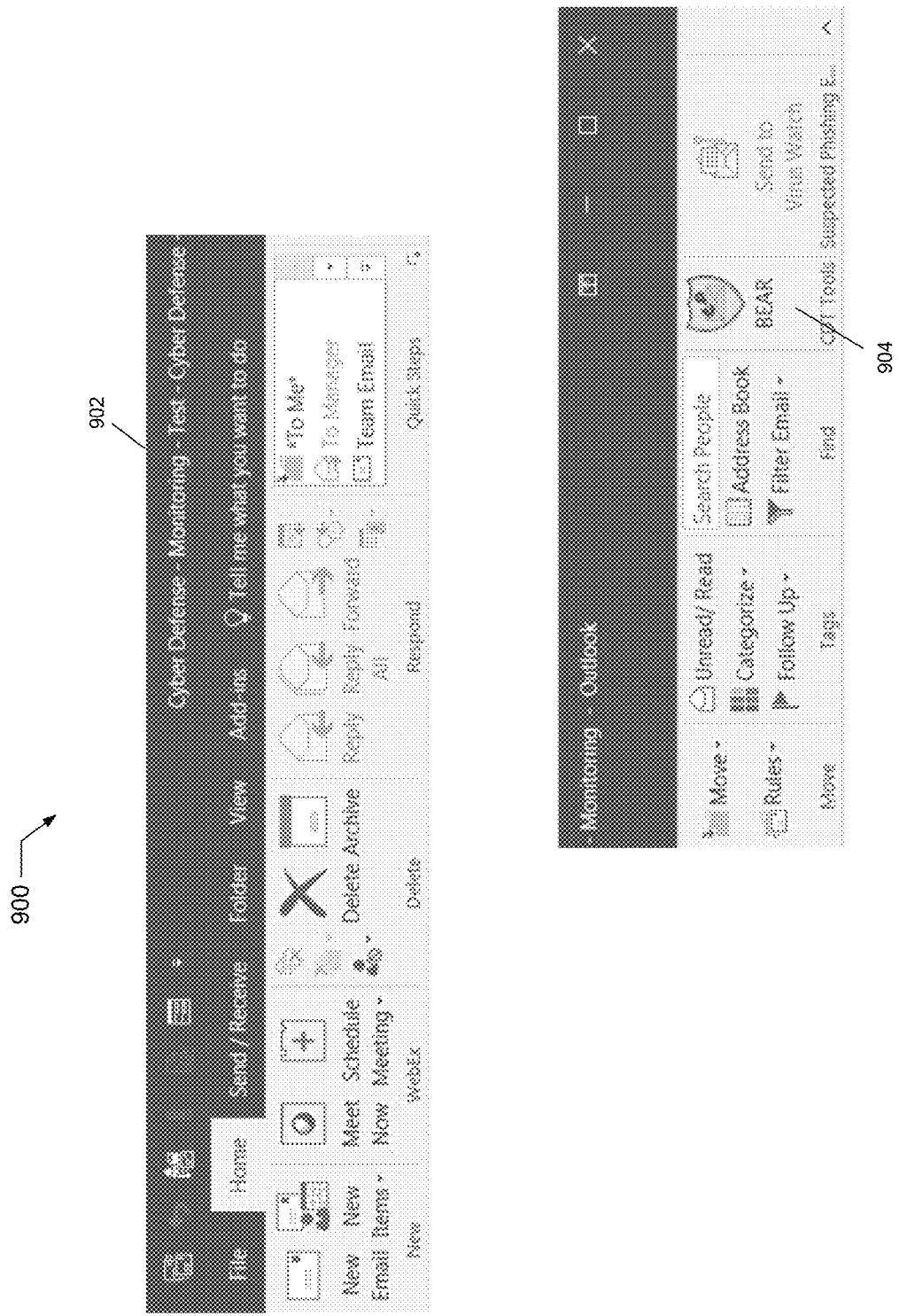
FIG. 9 illustrates an example screenshot of an email client including a plug-in button for an email security system, according to some embodiments.

FIG. 5A illustrates an example screenshot 500 of an Artifact Dashboard generated by the disclosed email security system. The Artifact Dashboard 500 is configured to have the same "look and feel" as the email client. The email security system, and the Artifact Dashboard presented by the email security system, may be accessible via a button on the email client. For example, the email security system may be accessible as a plug-in, which is software that adds a specific feature to an existing computer program, to the email client, which may be Microsoft Outlook®. The plug-in may be software code written in the programming language C Sharp or C #. For example, referring to FIG. 9, FIG. 9 illustrates an example screenshot 900 of an email client toolbar, such as the Microsoft Outlook toolbar. The email security system may be termed as a Built-In Email Analysis and Response ("BEAR") tool. Toolbar 902 includes a plug-in button 904 which allows the administrator to easily access the email security system from within the email client. Clicking on the plug-in button 904 sends an email message to the email security system 400, and presents an Artifact Dashboard for the email message.

An email client, such as Microsoft Outlook, is an application on the administrator's computer. Depending on the configuration of the application, an application may have access to and/or store files on the computer running the application. Thus, an email message that contains malware may be downloaded to, or stored in the memory of, the computer running the email client application. Some applications have access to a separate temporary memory, such as RAM (random access memory). Some applications reserve an amount of memory in the computer. An email client may accordingly use some of the memory allocated to that email client to temporarily store email message, including email messages such as email message 402. In one embodiment, the email security system 400 prevents a payload associated with email message 402 from leaving the memory allocated the email client and being stored on the administrator's computer's general/disk memory while the administrator is examining/analyzing the email message 402. For example, the email security system may stream (using temporary memory/buffers) a payload from the email server or the email client to the tools associated with the payload buttons, without actually storing the payload on the administrator computer's disk.

Referring back to FIG. 5A, the email security system presents the sender and the subject of the email via fields 502 and 504, respectively, of the Artifact Dashboard 500. The email security system parses the email message and automatically detects Internet links in the email message, and presents each link in field 508 of the Artifact Dashboard.

The email security system also provides payload buttons 510, 512, 514, 516, 518, 520, 522 and 524 that correspond to actions that the administrator can take on each Internet link listed in field 508. A payload button may send the Internet link to a separate tool or website for analysis of the Internet link. Or, a payload button may perform some other act on the Internet link. The payload buttons associated with the Internet link field 508 may be configurable by the administrator. By providing all of the payload buttons adjacent to the Internet link, the Artifact Dashboard enables the administrator to easily act on the Internet link without having to separately open-up or access a variety of different tools to analyze the Internet link.

Payload button 510 transmits a URL to a dynamic analysis solution ThreatGuard® without storing the artifact on disk. For example, payload button 510 may cause the administrator computer to stream the artifact to the analysis solution as discussed above.

Payload button 512 copies a selected Internet link 508 to the computer's copy buffer without risking accidental compromise/activation of the selected Internet link 508.

Payload button 514 sends the artifact to host analysis solution (Carbon Black®) for evidence of prior visits to the selected Internet link 508 by other computers on the administrator's network.

Payload button 516 sends the artifact to a tool that searches proxy logs for evidence of network traffic to the selected Internet link 508.

Payload button 518 sends the artifact to a tool that searches proxy classifications of the base domain in the selected Internet link 508.

Payload button 520 sends the artifact to a tool that searches a proxy classification for the full Internet link 508, not just the base domain.

Payload button 522 sends the artifact to public resource "Virus Total" to determine if an Internet link has been determined by popular security vendors to be malicious.

Payload button 524 sends the artifact to public resource "urlquery.net" to "visit" the site and view its contents or redirects in a safe, trusted environment.

Notably, unlike the payload buttons, the Internet link field 508 which displays the Internet link is not actionable. Thus, text displayed in the Internet link field 508 may appear to be an Internet link, but an administrator cannot interact with the text in the same way as a typical Internet link. The Artifact Dashboard 500 insulates the administrator's computer from any possibility of actually activating or executing the link.

The email security system also parses the email message and automatically detects the header of the email message, and presents payload buttons 506 which allow the administrator to copy the email header to the administrator computer's copy buffer clipboard so the administrator can then paste it or use it in another application, or view the header, or toggle between a full header and a condensed header.

The email security system also parses through the email message and identifies any attachments to the email message and presents them to the administrator via field 526. Similar to field 508, field 526 is not an actionable field, and the administrator cannot actually open the attachments listed in field 526. Thus, an administrator is prevented from interacting with attachments in the normal, expected way. Accordingly, the Artifact Dashboard increases the security with which the administrator can interface with or manipulate contents of the email message by removing the functionality associated with, or rendering inert, the Internet links in field 508 or the attachments in field 526. The Artifact Dashboard 500 also displays or presents to the administrator payload buttons 528, 530, 532, 534, 536 and 538 adjacent to field 526. Payload buttons 528, 530, 532, 534, 536, and 538 enable the administrator to perform actions on the attachments in field 526.

Payload button 528 transmits an attachment to a dynamic analysis solution ThreatGuard® without storing the artifact on disk. For example, payload button 510 may cause the administrator computer to stream the artifact to the analysis solution as discussed above.

Payload button 530 searches a public resource "Virus Total" to determine if an attachment has been determined by popular security vendors to be malicious.

Payload button 532 sends the artifact to host analysis solution (Carbon Black®) for evidence of prior instances of receiving the attachment 526 by other computers on the administrator's network.

Payload button 534 sends a hash and name of the selected attachment to a third party intelligence site to determine if the selected attachment is malicious.

Payload button 536 copies a selected attachment 526 to the computer's copy buffer without risking accidental compromise/activation of the selected attachment 526.

Payload button 538 copies a hash of the selected attachment to the computer's copy buffer in one of the formats currently in use so that the administrator can use the hash in another application if desired.

The Artifact Dashboard also presents action buttons 540, 542, 544, 546 and 548 that enable the administrator to quickly perform actions to process the email message or to follow a defined security workflow. Action buttons increase the convenience with which an administrator can process an email, after analyzing its artifacts/payloads. The action buttons may be configurable, allowing the administrator to flexibly handle different email messages. Action button 540 allows the administrator to classify the status of the email messages. Other administrators may be able to see the status of an email message being handled by an administrator. Action button 542 allows the administrator to classify, or categorize, an email message, e.g., malware, safe, etc.

Action button 544 causes the administrator computer to send a templated email message responsive to the submitter of the email message 402. The templated email response may be tailored based on category/risk level of the email message submitted by the user.

Action button 546 causes the administrator computer to send a templated email message to an Email Service team to remove malicious email messages from the network.

Action button 548 causes the administrator computer to send a templated warning email message to the submitter of the email message 402. The action buttons may be contextually associated with actions that the administrator can perform for the email message being analyzed. The buttons that are presented on the Artifact Dashboard depend on the artifacts that are detected by the Artifact Detector 404. The Artifact Dashboard may be dynamic to only provide the buttons necessary to handle the email message 402 being analyzed.

In one embodiment, the payload buttons may have two visual states: one state before the button has been pressed/interacted with by the administrator, and another state (e.g., a depressed button icon) that is displayed after the administrator presses/interacts with the button. Accordingly, the Artifact Dashboard provides visual cues to the administrator that a button has or has not been pressed, so the administrator can visually ascertain whether a tool/action has been used or performed for an artifact.

In one embodiment, the email security system may not allow the administrator to dispose of, or mark the email message analysis as complete (e.g., in an email ticketing system) until specified buttons have been pressed or used. In other words, the email security system may require certain, or all, of the buttons associated with an artifact to be pressed before the email message can be marked as handled or analyzed.

Figure 5B:
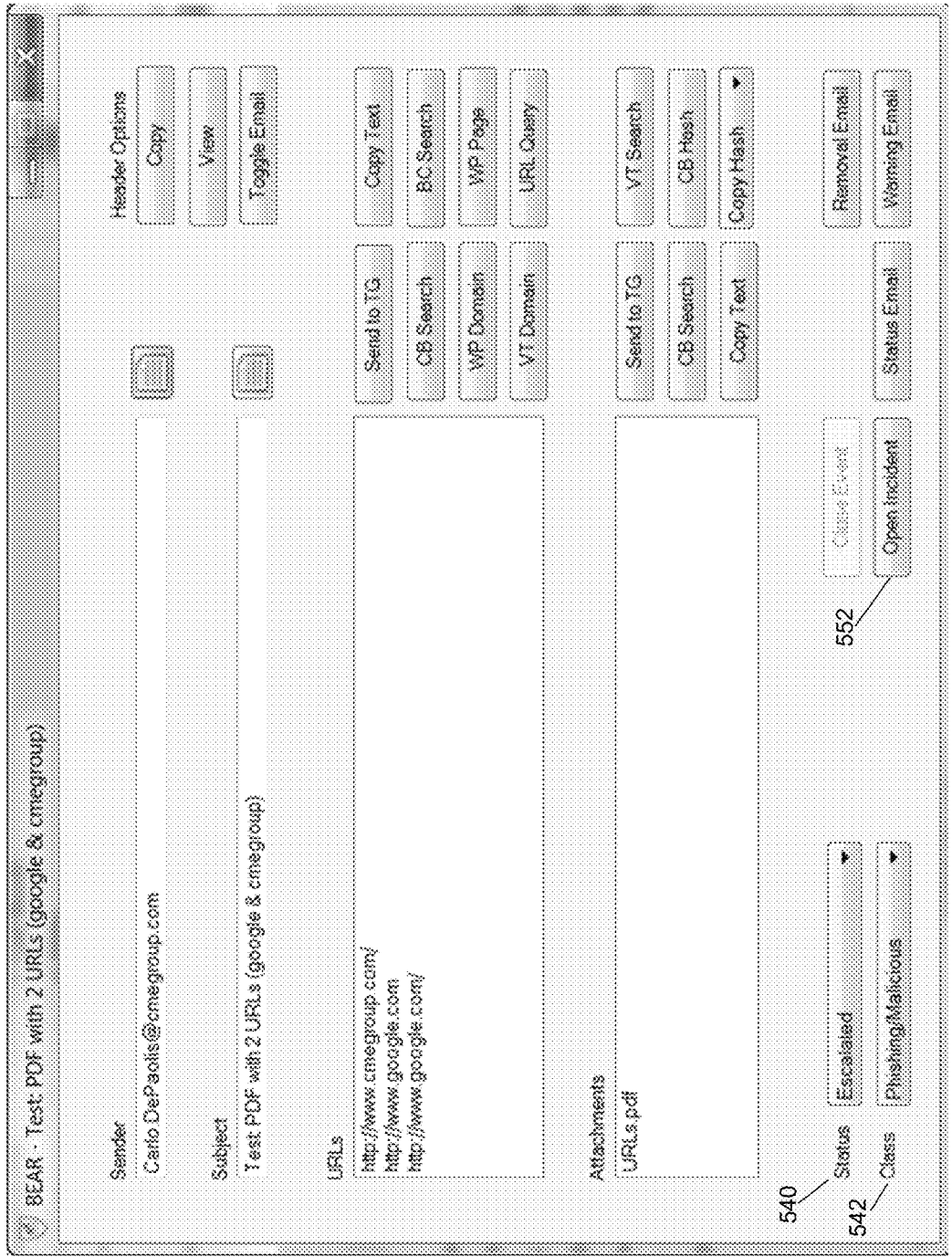
FIG. 5B depicts another example Artifact Dashboard presented by the email security system, according to some embodiments.

For example, some of the action buttons may be dependent on the values selected by the administrator for the status/class action buttons 540 and 542. As shown in FIG. 5B, which illustrates another screenshot 550 of the Artifact Dashboard, upon setting the status button 540 to "Escalated" and the class button 542 to "Phishing/Malicious", the Artifact Dashboard 550 presents the option to select/interact with action button 552, which allows the administrator to open a new incident in a ticket management system used by email security teams. In comparison, button 552 was not an option that the administrator could select in FIG. 5A.

In one embodiment, the Artifact Dashboard may present an option to cause the administrator computer to send selected artifacts to a monitoring appliance that can generate alerts upon detecting the selected artifact in other email messages. In an embodiment, the email security system may search a database of previously processed email messages, and may present to the administrator, e.g., via a window within the Artifact Dashboard, information about other related email messages that contained artifacts detected in the current email message 402.

Figure 6:
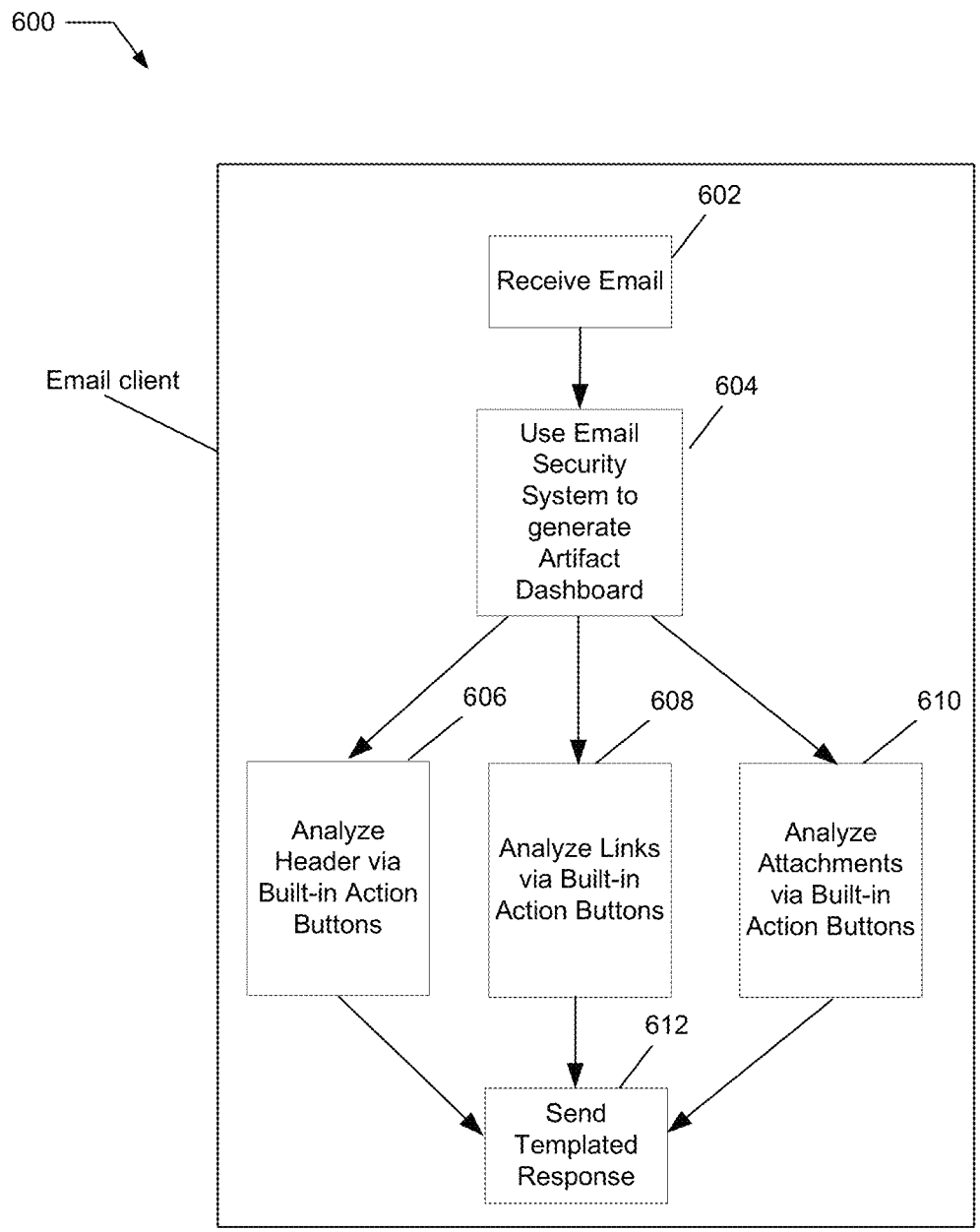
FIG. 6 depicts an example workflow for processing email messages, according to some embodiments.

FIG. 6 illustrates an example streamlined workflow 600 enabled by the email security system that is more efficient and safer than the workflow 300. Upon receiving an email message that is suspected to contain malware (step 602), the administrator/user simply has to open the email security system, which reformats and decomposes the email message and present the email message in the Artifact Dashboard (step 604). The administrator does not have to leave the email client, but instead simply clicks on a button that is integrated within the email client to activate the email security system which, in turn, presents information within the Artifact Dashboard.

From the Artifact Dashboard, the administrator can analyze a header via the built-in payload buttons (step 606), analyze Internet links via built-in payload buttons (step 608), or analyze attachments via built-in payload buttons (step 610). Because the user does not actually interact with any of the artifacts within the email message, streamlined workflow 600 is much more secure than previous workflows.

The administrator's computer is not exposed to any of the artifacts that may contain malicious content, yet the administrator is able to see all of the artifacts and perform actions on the artifacts. After analyzing the various artifacts presented in the Artifact Dashboard, the administrator can categorize the email message and send a templated response (step 612) to the original submitter of the email message.

Figure 7:
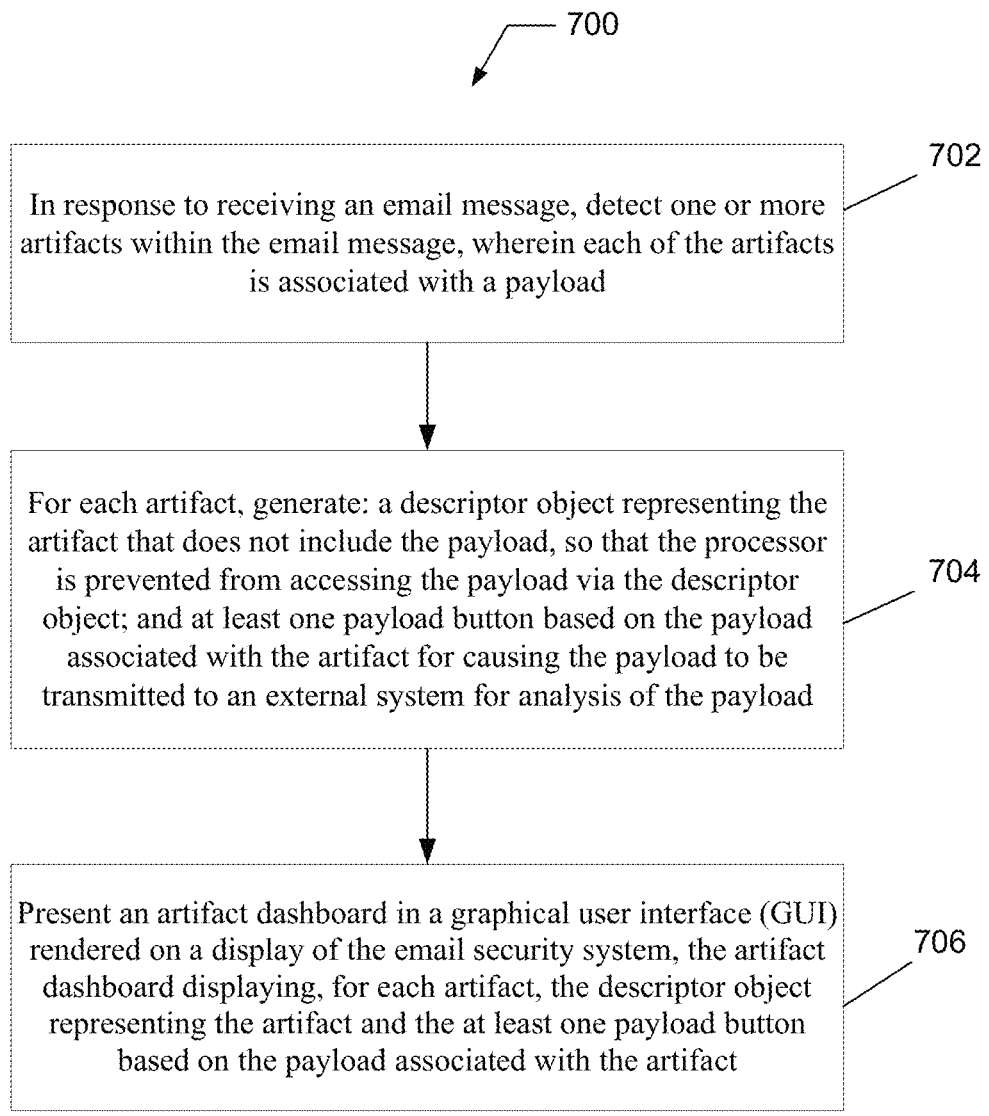
FIG. 7 depicts a high-level flowchart illustrating a method implemented by an email security system, according to some embodiments.

FIG. 7 illustrates an example flowchart of an example computer implemented method 700. Embodiments may involve all, more or fewer actions than the illustrated actions. The actions may be performed in the order or sequence shown, or in a different sequence. The actions may be performed simultaneously, or in a parallel or overlapping fashion. The method may be performed by processing logic that may comprise hardware (circuitry, dedicated logic, etc.), software, or a combination of both. In one example, the method is performed by the computer system 100 of FIG. 1, while in some other examples, some or all of the method may be performed by another machine.

At step 702, method 700 includes, in response to receiving an email message, detecting one or more artifacts within the email message, wherein each of the artifacts is associated with a payload. For example, if the method 700 is implemented by an email security system 400, the email security system may detect artifacts within the email message.

At step 704, method 700 includes, for each artifact, generating: a descriptor object representing the artifact that does not include the payload, so that the processor is prevented from accessing the payload via the descriptor object; and at least one payload button based on the payload associated with the artifact for causing the payload to be transmitted to an external system for analysis of the payload. For example, the email security system may include an artifact detector 404 that generates a descriptor object and a payload for each artifact.

At step 706, method 700 includes presenting an artifact dashboard in a graphical user interface (GUI) rendered on a display of the email security system, the artifact dashboard displaying, for each artifact: the descriptor object representing the artifact and the at least one payload button based on the payload associated with the artifact. For example, the email security system may present an Artifact Dashboard 412 on a display of the email security system.

Figure 8:
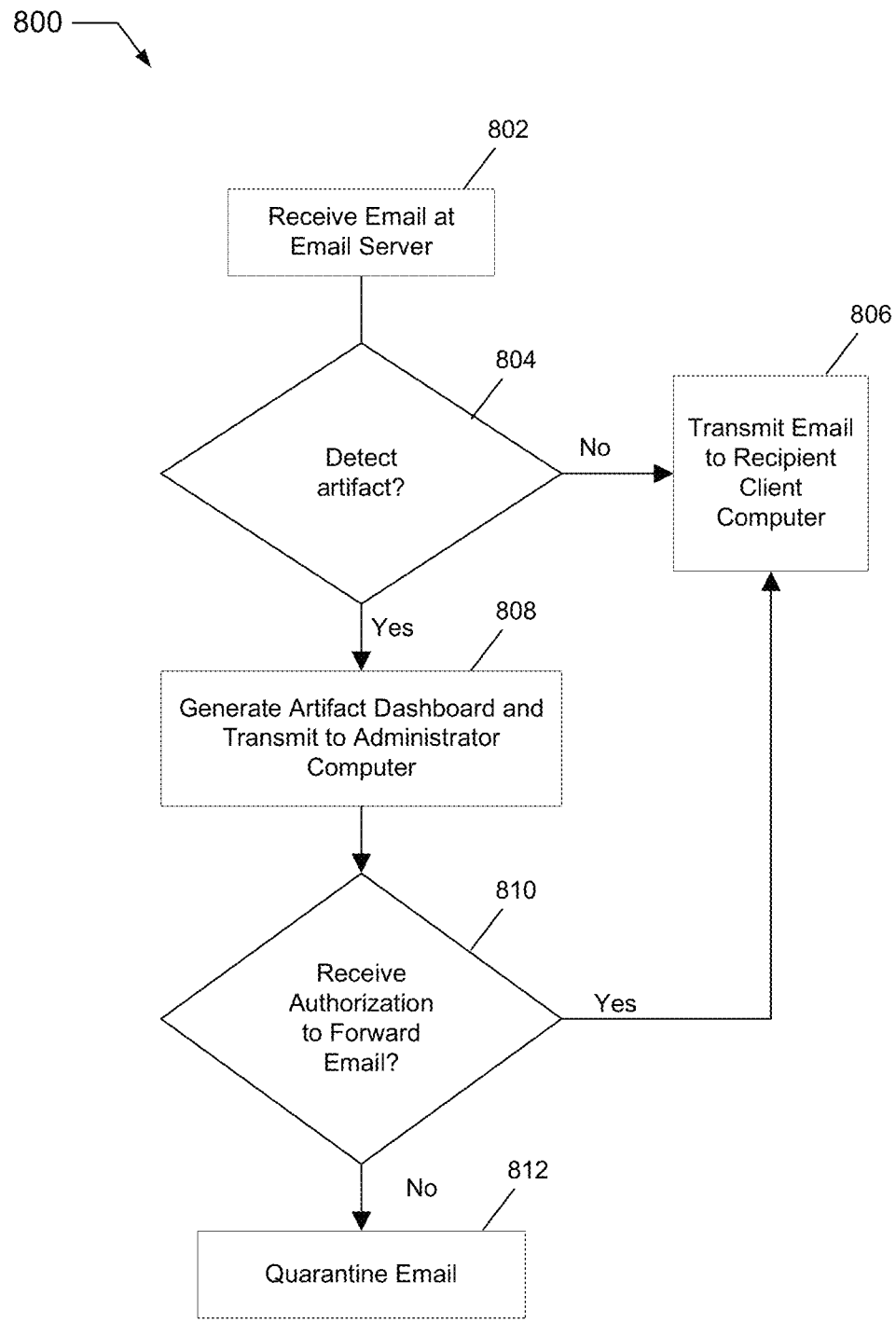
FIG. 8 depicts another example workflow for processing email messages at an email server, according to some embodiments.

As is known in the art, email messages are typically routed through an email server before being delivered to a recipient's computer. In one embodiment, the email security system 400 may be implemented on an email server that automatically intercepts email messages directed to recipients. FIG. 8 illustrates an example process 800 for processing email messages by email security system 400 at an email server. An email server receives an email message 802 before the email message is delivered to the recipient. Thus, process 800 does not require a user to even suspect that an email message may contain malware and thereafter forward the suspected email message to an administrator, e.g., an administrator in the information security department of a company. All email messages that are addressed to the recipient are automatically intercepted by the email security system before the recipient can even receive the email messages. If the email security system does not detect an artifact in the email message 804, the email security system 400 transmits 806 or otherwise releases the email message to the recipient client computer. However, if the email security system detects an artifact in the email message 804, the email security system 400 generates the Artifact Dashboard and transmits 808 only the Artifact Dashboard, and not the email message, to an administrator computer. The email security system 400 waits until it receives authorization 810 to forward the email message to the recipient client computer. The administrator reviewing the Artifact Dashboard may investigate the artifacts/payloads in the email message as described above, and then provide a response (e.g., in the form of authorization to release the email message) to the email security system 400. If the administrator reviewing the Artifact Dashboard authorizes the email message to be forwarded to the recipient 810, the email security system 400 transmits 806 the email message to the recipient client computer. If the administrator reviewing the Artifact Dashboard does not authorize the email message to be forwarded to the recipient, the email security system 400 quarantines the email message 812. In one embodiment, if the administrator reviewing the Artifact Dashboard does not authorize the email message to be forwarded to the recipient, the email security system 400 deletes the email message, thereby preventing unauthorized, unsafe email messages from ever reaching the recipient's computer system.

In one embodiment, if the email security system 400 does not receive authorization within a threshold amount of time, the email security system 400 quarantines the email message after the expiration of the threshold amount of time.

In one embodiment, the email security system at step 808 transmits the Artifact Dashboard to the intended recipient (i.e., the recipient listed in the To field of the email) instead of the administrator. If the recipient, upon analyzing the Artifact Dashboard, authorizes the email security system 400 to release the email message, the email security system releases the email message to the intended recipient.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the described embodiments should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

The invention claimed is:

1. A computer implemented method of an email security system for processing email messages, the method comprising:
   in response to receiving an email message, detecting, by a processor of the email security system, one or more artifacts within the email message, wherein each of the one or more artifacts is associated with a payload;
   for each of the one or more artifacts, generating, by the processor:
      a descriptor object representing the artifact and that does not include the payload, so that the processor is prevented from accessing the payload via the descriptor object; and
      at least one payload button, based on the payload associated with the artifact, for causing the payload to be transmitted to an external system for analysis of the payload;
   presenting, by the processor, an artifact dashboard in a graphical user interface (GUI) rendered on a display of the email security system, the artifact dashboard displaying, for each of the one or more artifacts, the descriptor object representing the artifact and the at least one payload button based on the payload associated with the artifact;
   determining, by the processor, whether each of the at least one payload button has been interacted with by a user of the email security system via the GUI to cause the associated payload to be transmitted to the external system for analysis; and
   presenting, by the processor, a disposal button via the GUI which allows the user to complete a review of the email message only once the processor has determined that the user has interacted with all of the at least one payload buttons.

2. The computer implemented method of claim 1, wherein each of the one or more artifacts is one of an Internet link contained in the email message or an attachment to the email message.

3. The computer implemented method of claim 2, wherein when the artifact is an internet link contained in the email message, the payload is an Internet website, and when the artifact is an attachment to the email message, the payload is a file.

4. The computer implemented method of claim 1, wherein the artifact dashboard displays a classifier object for classifying the email message based on an analysis of the payload.

5. The computer implemented method of claim 1, wherein the artifact dashboard displays a template object for transmitting a templated response to the email message.

6. The computer implemented method of claim 1, wherein the email message specifies a recipient, wherein the email security system is implemented on an email server, and wherein the method further comprises:
   intercepting the email message before the email message is delivered to the recipient; and
   transmitting the email message to the recipient only upon receiving authorization to transmit the email message to the recipient.

7. The computer implemented method of claim 6, wherein the email security system releases the email message for delivery to the recipient after receiving authorization.

8. An email security system comprising:
   a processor;
   a display communicatively coupled to the processor; and
   a memory communicatively coupled to the processor, the memory comprising software that, when executed by the processor, performs operations that cause the processor to:
      in response to receiving an email message, detect one or more artifacts within the email message, wherein each of the one or more artifacts is associated with a payload;
      for each of the one or more artifacts, generate:
         a descriptor object representing the artifact and that does not include the payload, so that the processor is prevented from accessing the payload via the descriptor object; and
         at least one payload button based on the payload associated with the artifact for causing the payload to be transmitted to an external system for analysis of the payload;
      present an artifact dashboard in a graphical user interface (GUI) rendered on a display of the email security system, the artifact dashboard displaying, for each of the one or more artifacts, the descriptor object representing the artifact and the at least one payload button based on the payload associated with the artifact;
      determine whether each of the at least one payload button has been interacted with by a user of the email security system via the GUI to cause the associated payload to be transmitted to the external system for analysis; and present a disposal button via the GUI which allows the user to complete a review of the email message only once the user has interacted with all of the at least one payload buttons.

9. The email security system of claim 8, wherein each of the one or more artifacts is one of an Internet link contained in the email message or an attachment to the email message.

10. The email security system of claim 9, wherein when the artifact is an internet link contained in the email message, the payload is an Internet website, and when the artifact is an attachment to the email message, the payload is a file.

11. The email security system of claim 8, wherein the artifact dashboard displays a classifier object for classifying the email message based on an analysis of the payload.

12. The email security system of claim 8, wherein the artifact dashboard displays a template object for transmitting a templated response to the email message.

13. The email security system of claim 8, wherein the email message specifies a recipient, wherein the email security system is implemented on an email server, and wherein the processor is further configured to:
   intercept the email message before the email message is delivered to the recipient; and
   transmit the email message to the recipient only upon receiving authorization to transmit the email message to the recipient.

14. The email security system of claim 13, which releases the email message for delivery to the recipient after receiving authorization.

15. A non-transitory computer readable medium storing instructions that, when executed by a processor, cause the processor to:
   in response to receiving an email message, detect one or more artifacts within the email message, wherein each of the one or more artifacts is associated with a payload;
   for each of the one or more artifacts, generate:
      a descriptor object representing the artifact and that does not include the payload, so that the processor is prevented from accessing the payload via the descriptor object; and
      at least one payload button based on the payload associated with the artifact for causing the payload to be transmitted to an external system for analysis of the payload;
   present an artifact dashboard in a graphical user interface (GUI) rendered on a display of the email security system, the artifact dashboard displaying, for each of the one or more artifacts, the descriptor object representing the artifact and the at least one payload button based on the payload associated with the artifact;
   determine whether each of the at least one payload button has been interacted with by a user of the email security system via the GUI to cause the associated payload to be transmitted to the external system for analysis; and
   present a disposal button via the GUI which allows the user to complete a review of the email message only once the user has interacted with all of the at least one payload buttons.

16. The non-transitory computer readable medium of claim 15, wherein each of the one or more artifacts is one of an Internet link contained in the email message or an attachment to the email message.

17. The non-transitory computer readable medium of claim 16, wherein when the artifact is an internet link contained in the email message, the payload is an Internet website, and when the artifact is an attachment to the email message, the payload is a file.

18. The non-transitory computer readable medium of claim 15, wherein the artifact dashboard displays a classifier object for classifying the email message based on an analysis of the payload.

19. The non-transitory computer readable medium of claim 15, wherein the artifact dashboard displays a template object for transmitting a templated response to the email message.

20. The non-transitory computer readable medium of claim 15, wherein the email message specifies a recipient, wherein the email security system is implemented on an email server, and wherein the instructions cause the processor to:
   intercept the email message before the email message is delivered to the recipient; and
   transmit the email message to the recipient only upon receiving authorization to transmit the email message to the recipient.

21. The non-transitory computer readable medium of claim 20, wherein the instructions cause the processor to release the email message for delivery to the recipient after receiving authorization.

22. A computer system comprising:
   in response to receiving an email message, means for detecting one or more artifacts within the email message, wherein each of the one or more artifacts is associated with a payload;
   means for generating, for each of the one or more artifacts:
      a descriptor object representing the artifact and that does not include the payload, preventing access to the payload via the descriptor object; and
      at least one payload button based on the payload associated with the artifact for causing the payload to be transmitted to an external system for analysis of the payload;
   means for presenting an artifact dashboard in a graphical user interface (GUI) rendered on a display of the email security system, the artifact dashboard displaying, for each of the one or more artifacts, the descriptor object representing the artifact and the at least one payload button based on the payload associated with the artifact;
   means for determining whether each of the at least one payload button has been interacted with by a user of the email security system via the GUI to cause the associated payload to be transmitted to the external system for analysis; and
   means for presenting a disposal button via the GUI which allows the user to complete a review of the email message only once the user has interacted with all of the at least one payload buttons.

* * * * *